United States Patent
Byun et al.

(10) Patent No.: US 8,835,025 B2
(45) Date of Patent: Sep. 16, 2014

(54) BATTERY PACK HAVING A COMBINED BARE CELL, PROTECTION CIRCUIT MODULE AND TOP CASE

(75) Inventors: Jeongdeok Byun, Yongin-si (KR); Suk Koh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 986 days.

(21) Appl. No.: 12/379,431

(22) Filed: Feb. 20, 2009

(65) Prior Publication Data

US 2009/0297891 A1  Dec. 3, 2009

(30) Foreign Application Priority Data

Jun. 3, 2008  (KR) .................. 10-2008-0052275

(51) Int. Cl.
H01M 2/06   (2006.01)
H01M 2/08   (2006.01)
H01M 2/22   (2006.01)
H01M 2/30   (2006.01)
H01M 2/34   (2006.01)
H01M 10/42  (2006.01)

(52) U.S. Cl.
CPC .............. *H01M 2/22* (2013.01); *H01M 10/425* (2013.01); *Y02E 60/12* (2013.01); *H01M 2/34* (2013.01)
USPC ............................... 429/7; 429/181; 429/185

(58) Field of Classification Search
USPC ............................... 429/7, 185, 181
See application file for complete search history.

(56) References Cited

U.S. PATENT DOCUMENTS

| | | |
|---|---|---|
| 5,705,290 A | 1/1998 | Azema |
| 2003/0108780 A1* | 6/2003 | Iwaizono et al. .................. 429/7 |
| 2005/0208345 A1 | 9/2005 | Yoon et al. |
| 2006/0019160 A1 | 1/2006 | Han |
| 2007/0160878 A1 | 7/2007 | Kim et al. |
| 2010/0143793 A1* | 6/2010 | Yamamoto .................... 429/175 |

FOREIGN PATENT DOCUMENTS

| | | | |
|---|---|---|---|
| CN | 1914748 A | | 2/2007 |
| JP | 2006114468 A | * | 4/2006 |
| KR | 1020040074487 A | | 8/2004 |
| KR | 1020050077480 A | | 8/2005 |
| KR | 10-2005-0123367 A | | 12/2005 |
| KR | 1020050123365 A | | 12/2005 |
| KR | 10-2007-0066407 A | | 6/2007 |
| KR | 10-2007-0080868 A | | 8/2007 |
| WO | WO 2006126379 A1 | * | 11/2006 |

OTHER PUBLICATIONS

Sai et al., Machine translation of JP 2006114468 A, Apr. 2006.*
Chinese Office Action issued by SIPO, dated Mar. 23, 2011, corresponding to Chinese Patent Application No. 200910142053.6, together with English translation.

* cited by examiner

*Primary Examiner* — Sean P Cullen
(74) *Attorney, Agent, or Firm* — Robert E. Bushnell, Esq.

(57) ABSTRACT

A battery pack that implements an electrical coupling structure between a bare cell and a protection circuit module without welding includes: a bare cell including an electrode assembly, a can receiving the electrode assembly and a cap assembly sealing an opening of the can; a protection circuit module provided with a pin that is electrically coupled to an electrode terminal of the bare cell; and a top case, receiving the protection circuit module, and combined with the bare cell.

20 Claims, 8 Drawing Sheets

BATTERY PACK HAVING A COMBINED BARE CELL, PROTECTION CIRCUIT MODULE AND TOP CASE

CLAIM OF PRIORITY

This application makes reference to, incorporates the same herein, and claims all benefits accruing under 35 U.S.C. §119 from an application earlier filed in the Korean Intellectual Property Office on 3 Jun. 2008 and there duly assigned Serial No. 10-2008-0052275.

BACKGROUND OF THE INVENTION

1. Field of the Invention

The present invention relates to a battery pack, and more particularly, the present invention relates to a battery pack having an improved electrical coupling structure between a bare cell and a protection circuit module.

2. Description of the Related Art

Recently, compact and lightweight portable electronic devices, such as cellular telephones, notebook computers and camcorders, etc., have been actively developed and produced. The portable electronic devices include a built-in battery pack so as to be operated at locations where external power sources are unavailable. The battery pack includes a secondary battery that can be charged or discharged.

The secondary battery can be a nickel-cadmium (Ni—Cd) battery, a nickel-hydrogen (Ni—MH) battery, a lithium (Li) battery and a lithium ion (Li-ion) secondary battery, etc. Particularly, the lithium ion secondary battery has an operating voltage that is three times that of the nickel-cadmium (Ni—Cd) battery or the nickel-hydrogen (Ni—MH) battery that are usually used as a power supply of the portable electronic devices. In addition, the lithium ion secondary battery has been widely used because it has higher energy density per unit weight.

The secondary battery uses lithium group oxides as a cathode active material, and a carbonic material as an anode active material. The secondary battery is divided into a liquid electrolyte battery and a polymer electrolyte battery according to the kind of electrolyte used. A lithium ion battery uses a liquid electrolyte, and a lithium polymer battery uses a polymer electrolyte.

The secondary battery is formed by sealing a bare cell in a can containing an electrode assembly and electrolyte and then electrically coupling the bare cell to a protection circuit module. The bare cell is charged or discharged electricity through a chemical reaction and the protection circuit module protects the bare cell by controlling charge/discharge of the bare cell and preventing overcharge/overdischarge thereof.

In a conventional battery, the bare cell and protection circuit module are electrically and mechanically coupled to each other through a welding or soldering process. In other words, an electrode terminal and a lead plate of the protection circuit module are connected to each other by welding or soldering and then the lead plate is welded or soldered to the electrode terminal of the bare cell.

Accordingly, the welding or soldering process is performed several times in assembling the bare cell and protection circuit module. Thus, it takes a great deal of time and the process is difficult.

Particularly, the welding or soldering process are not suitable for high precision that is required due to the recent trend to slim the battery.

SUMMARY OF THE INVENTION

Accordingly, an object of the present invention is to provide a battery pack in which a protection circuit module is electrically coupled to a bare cell without welding them together.

According to another object of the present invention, is to provide a battery pack having a simplified assembling process of the protection circuit module and bare cell.

Additional advantages, objects and features of the present invention will be set forth in part in the description which follows and in part will become apparent to those having ordinary skill in the art upon examination of the following or may be learned from practice of the present invention.

According to one aspect of the present invention, a battery pack is provided including: a bare cell including an electrode assembly, a can receiving the electrode assembly and a cap assembly sealing an opening of the can; a protection circuit module provided with a pin that is electrically coupled to an electrode terminal of the bare cell; and a top case, receiving the protection circuit module, being combined with the bare cell.

The electrode terminal of the bare cell may include a first electrode terminal that is insulated and extended outward from the cap plate and a second electrode terminal formed of the cap plate.

The pin may include a first electrode pin that is provided at the middle of the protection circuit board and connected to the first electrode terminal and a second electrode pin that is provided on both sides of the protection circuit board and connected to the second electrode terminal.

The pin may be riveted on the protection circuit board.

A sectional surface of the pin may be rectangular or circular. A sectional surface area of the pin may be gradually decreased toward a lower part of the pin and an end of the pin may be formed rectangular or circular or as a sharp cone. When the pin is formed as a sharp cone, a stopper may be provided on the protection circuit board to keep a gap between the protection circuit board and cap plate.

A aperture for insertion of the pin may be formed on surfaces of the electrode terminal and cap plate. The aperture may be formed rectangular or circular.

A lower end of the pin may be plated with electrical conductive material and the electrical conductive material may be gold or silver.

The pin may be made of nickel having excellent electrical conductivity and mechanical strength.

The lower end of the pin may be bonded to a surface of the electrode terminal by a conductive adhesive.

The pin may include a pin housing fixed to the protection circuit board, a connection pin projected through a lower opening from the inside of the pin housing, and an elastic member elastically supporting the connection pin in the direction of the opening.

A bent part may be formed at the lower end of the pin housing and a separation preventing part may be formed on an outer circumference of the connection pin to prevent the connection pin from being separated through the opening of the pin housing.

The protection circuit board may be combined integrally with the top case by right and left hook parts formed on both sides inside the top case.

The battery pack may further include a label surrounding upper periphery of the bare cell and lower periphery of the top case.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicated the same or similar components, wherein.

DETAILED DESCRIPTION OF THE INVENTION

Figure 1:
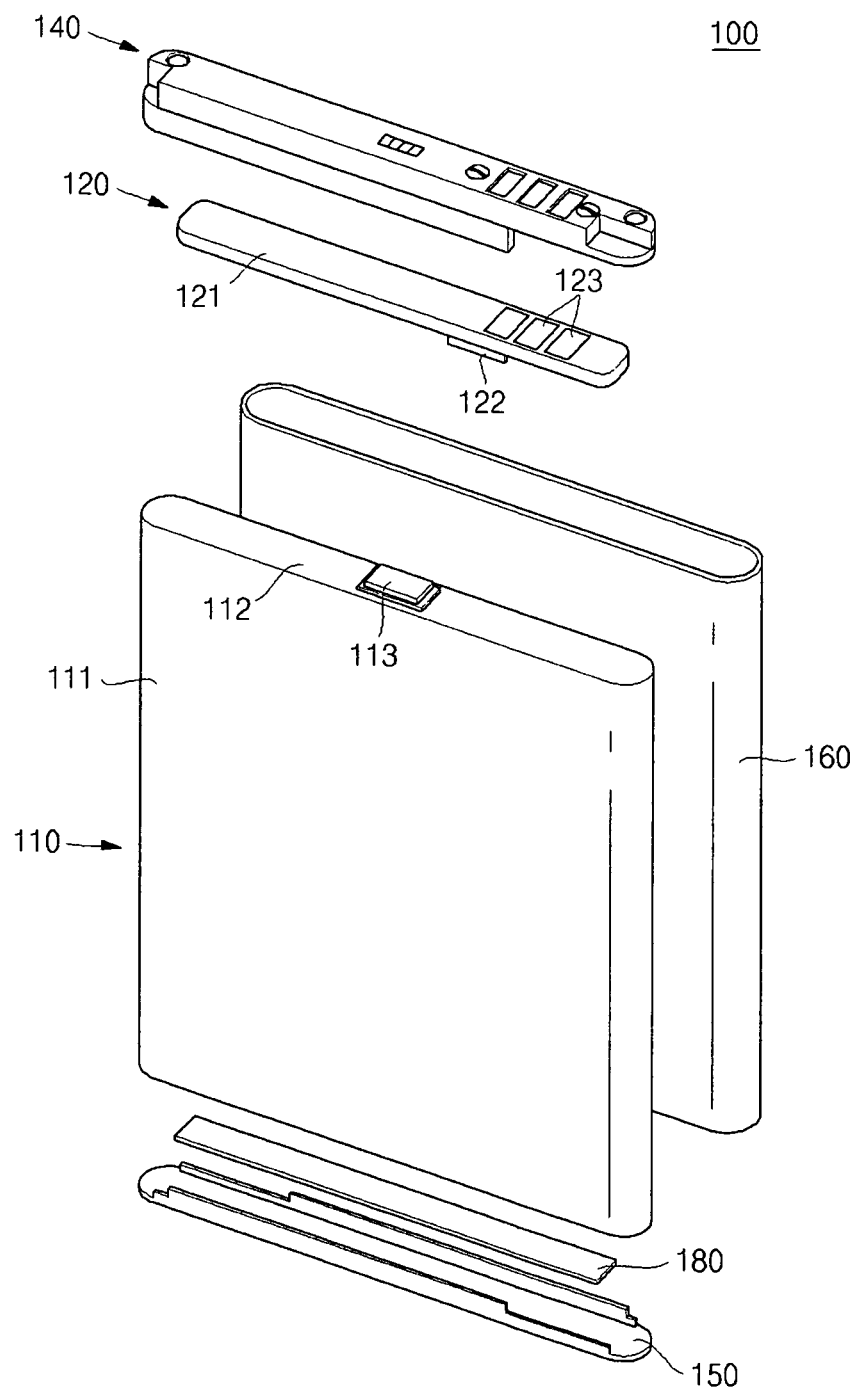
FIG. 1 is an exploded perspective view of a battery pack according to one exemplary embodiment of the present invention.

Hereinafter, exemplary embodiments of the present invention are described in detail with reference to the accompanying drawing. The aspects and features of the present invention and methods for achieving the aspects and features will be apparent by referring to the embodiments described in detail with reference to the accompanying drawings. However, the present invention is not limited to the embodiments disclosed hereinafter, but can be implemented in diverse forms. The matters defined in the description, such as the detailed construction and members, are merely specific details provided to assist those of ordinary skill in the art in a comprehensive understanding of the present invention, and the present invention is only defined within the scope of the appended claims. In the entire description of the present invention, the same drawing reference numerals are used for the same elements across various figures.

Figure 2:
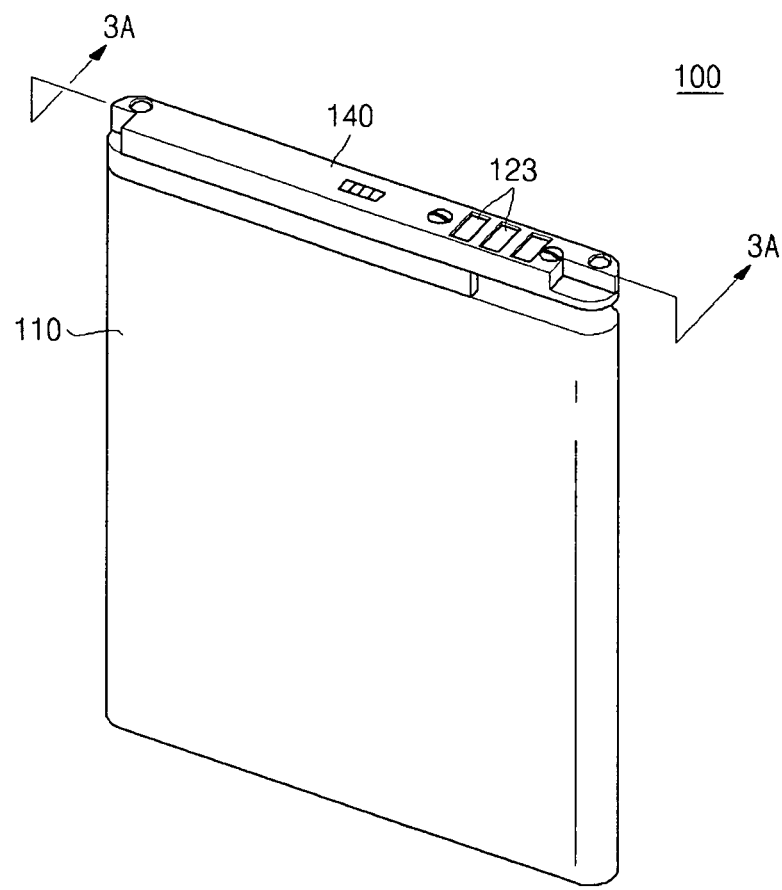
FIG. 2 is a perspective view of a combined state of a bare cell and a top case of the battery pack.
Figure 3A:
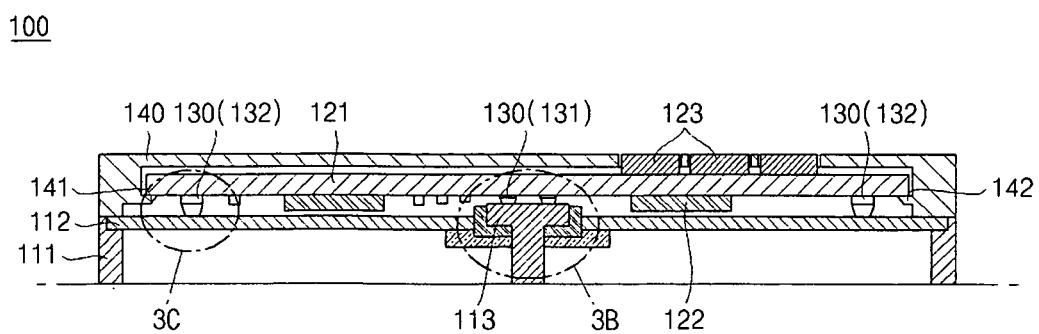
FIG. 3A is a sectional view taken along line '3A-3A' of FIG. 2.
Figure 3B:
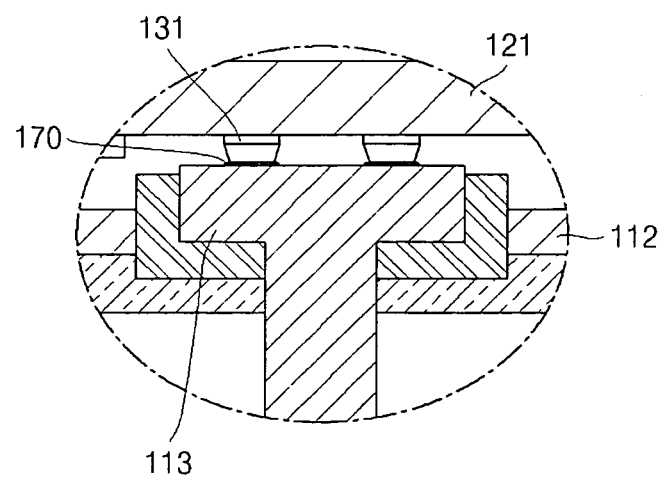
FIG. 3B is a magnified view of circled part '3B' of FIG. 3A.
Figure 3C:
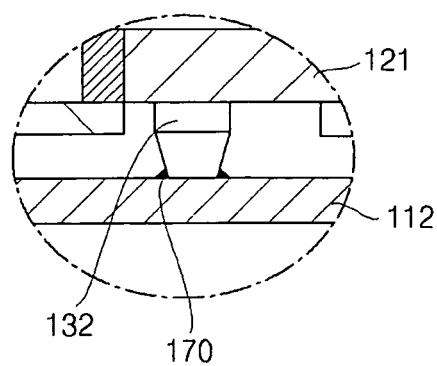
FIG. 3C is a magnified view of circled part '3C' of FIG. 3A.

FIG. 1 is an exploded perspective view of a battery pack according to one exemplary embodiment of the present invention and FIG. 2 is a perspective view of a combined state of a bare cell and a top case of the battery pack and FIG. 3A is a sectional view taken along line '3A-3A' of FIG. 2 and FIG. 3B is a magnified view of circled part '3B' of FIG. 3A and FIG. 3C is a magnified view of circled part '3C' of FIG. 3A.

Referring to FIGS. 1 to 3C, a battery pack 100 includes a bare cell 110, a protection circuit module 120, a pin 130 and a top case 140. The battery pack 100 further includes a bottom case 150 and a label 160.

In the battery pack 100, one end of the pin 130 is electrically coupled to an electrode terminal of the bare cell 110 and the other end is electrically coupled to an external terminal of the protection circuit module 120. Accordingly, the bare cell 110 and protection circuit module 120 are coupled to each other without welding.

The bare cell 110 is formed by providing an electrode assembly (not shown) in the can 111 and sealing an opening of the can 111 by a cap assembly including a cap plate 112.

The electrode assembly (not shown) is formed by interposing a separator between first and second plates and winding them together in a jelly-roll structure.

The can 111 is rectangular. The can may be made of aluminum or an aluminum alloy.

The cap plate 112 is provided at the middle of the cap assembly (not shown). The cap plate is provided with a through-hole and the first electrode terminal 113 of the bare cell 110 extends to the outside through the through-hole. The first electrode terminal 113 is provided in a through-hole (not shown) while being electrically insulated from the cap plate 112. Accordingly, the cap plate 112 functions as a second electrode terminal. It is desirable that the first electrode terminal 113 is an anode and the second electrode terminal 112 is a cathode. However, on the contrary, the first electrode terminal 113 may be the cathode and the second electrode terminal 112 may be the anode.

The protection circuit module 120 includes a protection circuit board 121 and many electrical elements 122 installed on the protection circuit board 121.

In addition, several external terminals 123 are provided on an upper surface of the protection circuit board 121 and the pin 130 is provided on a lower surface thereof, where the pin 130 is connected to the electrode terminal of the bare cell 110.

The pin 130 includes a first electrode pin 131 connected to the first electrode terminal 113 of the bare cell 110 and a second electrode pin 132 connected to the second electrode terminal 112 of the bare cell 110.

The first electrode pin 131 is provided at the middle of the lower surface of the protection circuit board 121. It is desirable that the first electrode pin 131 includes two pins connected to the first electrode terminal 113. However, the present invention is not limited thereto. One pin or more than three pins may be provided.

The second electrode pin 132 includes two pins that are respectively provided at right and left sides of the lower surface of the protection circuit board 121. However, more than two pins may be respectively provided at the right and left sides of the lower surface of the protection circuit board 121.

As described above, the numbers of first and second electrode pins 131 and 132 can be changed according to performance and design conditions of the battery and are not limited to the example noted above.

The pin 130 is electrically coupled to the external terminal 123 of the protection circuit board 121. In addition, the pin 130 is electrically coupled to the upper surface of the cap plate 112. Accordingly, cathode and anode currents of the bare cell 110 are transmitted to the outside of the battery through the external terminal 123.

The upper end of the pin 130 is fixed to the protection circuit board 121. The pin 130 may be fixed to the protection circuit board 121 by riveting, or the pin 130 may be integrally molded with the protection circuit board 121 by injection molding.

The pin 130 is made of nickel (Ni). The pin 130 made of nickel has excellent corrosion resistance, mechanical strength and electrical conductivity.

The lower end of the pin 130 may be plated with an electrically conductive material (not shown). The electrically conductive material may be gold or silver. The electrically conductive material plated on the lower end of the pin 130 greatly improves the electrical connection between the bare cell 110 and pin 130.

The lower end of the pin 130 is bonded to surfaces of the cap plate 112 and first electrode terminal 113. The lower end of the pin 130 may be bonded by a conductive adhesive 170. The conductive adhesive 170 may be a commonly used electrically conductive adhesive. However, the present invention is not limited thereto.

The conductive adhesive 170 attaches the pin 130 and cap plate 112 and first electrode terminal 113 and improves the electrical connection therebetween.

The protection circuit module 120 is combined with the top case 140. Left and right hook parts 141 and 142 are provided at both sides inside the top case 140 to prevent separation of the assembled protection circuit board 121.

One end of the protection circuit board 121 of the protection circuit module 120 is inserted inside one of the left and right hook parts 141 and 142. Then, when the other end of the protection circuit board 121 is inserted inside the other hook part, the protection circuit board 121 is restricted by the left and right hook parts 141 and 142.

As described above, the protection circuit module 120 is attached to the inside of the top case 140 and then the top case 140 is attached to the upper portion of the bare cell 110. The lower periphery of the top case 140 is attached to the upper periphery of the bare cell 110 by the label 160.

In addition, a bottom case 150 is attached to the lower end of the bare cell 110 by an adhesion element 180.

The pin 130 may be provided in various shapes.

Figure 4A:
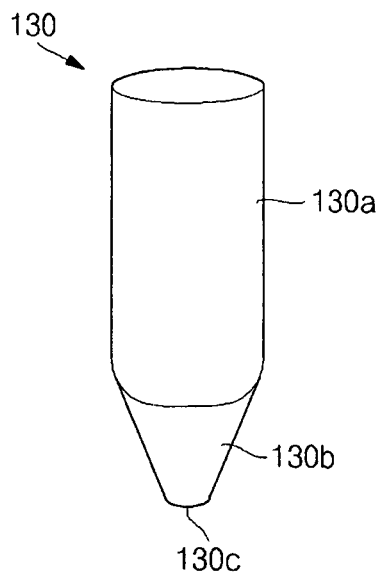
FIG. 4A is a perspective view of a pin according to another exemplary embodiment of the present invention.
Figure 4B:
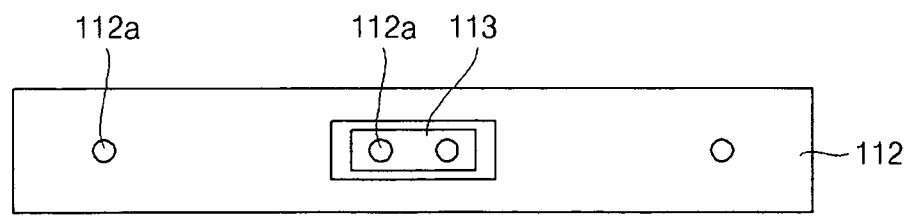
FIG. 4B is a plan view of a cap plate contacting the cylindrical pin of FIG. 4A.

Referring to FIGS. 4A and 4B for example, the pin 130 includes a body 130a and a connection part 130b extending from an end of the body 130a. The body 130a is formed in a shape of cylinder having a circular sectional surface. A diameter of the connection part 130b is gradually decreased toward the end thereof and the end 130c is formed in a shape of a truncated cone. First and second apertures 112a for insertion of the end 130c of the connection part 130b are formed on the surfaces of the cap plate 112 and first electrode terminal 113. The first and second apertures 112a are formed in a circular shape corresponding to the end 130c of the connection part 130b of the pin 130.

Accordingly, the end 130c of the pin 130 is easily inserted into the first and second apertures 112a. Thus, contact area between the pin 130 and cap plate 112 and first electrode terminal 113 is increased, thereby allowing electrical coupling to be stably kept between them.

Figure 5A:
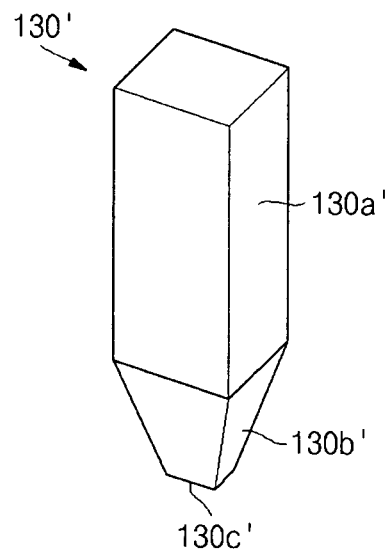
FIG. 5A is a perspective view of a pin according to a still another exemplary embodiment of the present invention.
Figure 5B:
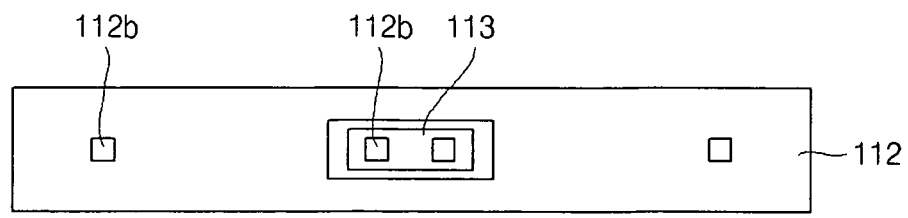
FIG. 5B is a plan view of a cap plate contacting the angular pin of FIG. 5A.

Referring to FIGS. 5A and 5B, a sectional surface of a body 130a' of a pin 130' is rectangular. The area of a connection part 130b' of the 130' is gradually decreased toward the end thereof having a pyramid shape. In addition, first and second apertures 112b are formed in a rectangular shape, where the first and second apertures 112b are formed on surfaces of the cap plate 112 and first electrode terminal 113 and the end 130c' of the connection part 130b' inserted into the apertures 112b.

The end 130c' of the pin 130' is easily inserted into the first and second apertures 112b. Thus, contact area between the pin 130' and cap plate 112 and first electrode terminal 113 is increased, thereby allowing electrical coupling to be stably kept between them.

For another example of the pin 130 or 130', an end of a pin 130" may be formed as a sharp cone.

Figure 6A:
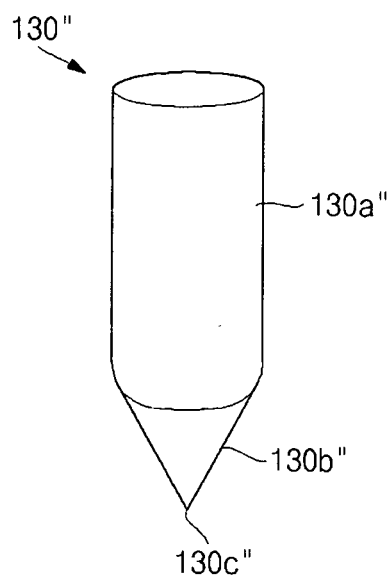
FIG. 6A is a perspective view of a pin according to a further exemplary embodiment of the present invention.
Figure 6B:
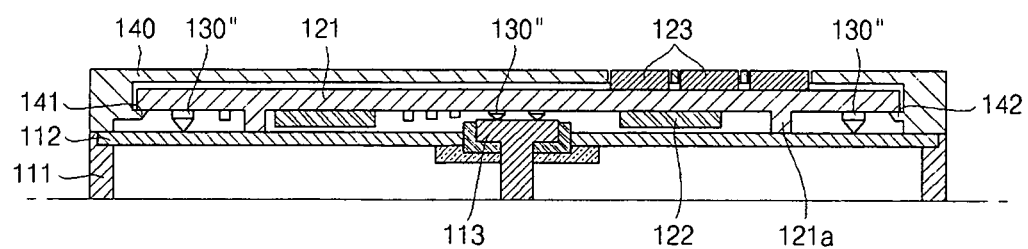
FIG. 6B is a sectional view of a battery pack provided with the pin of FIG. 6A.

Referring to FIGS. 6A and 6B, a sectional surface of a body 130a" of a pin 130" may be circular or rectangular. The area of a connection part 130b" of the pin 130" is gradually decreased toward the sharp end thereof.

Accordingly, the end 130c" is penetrated into the surfaces of the cap plate 112 and first electrode terminal 113 with very fine depth. A stopper 121a is provided on the lower surface of the protection circuit board 121 so as to prevent the end 130c" of the pin 130" from being deeply penetrated into the surface. The stopper 121a keeps a gap between the protection circuit board 121 and cap plate 112 constant.

A battery pack 200 according to another exemplary embodiment of the present invention is explained below.

Figure 7A:
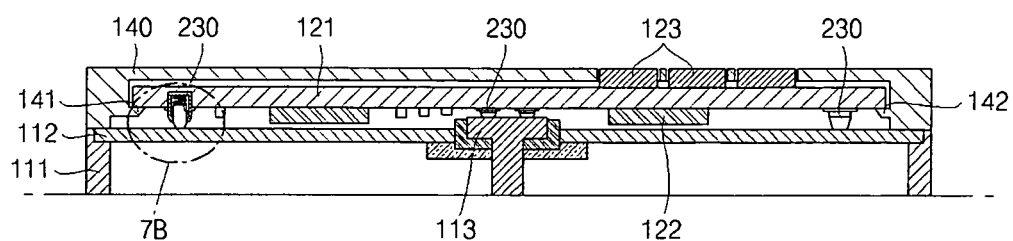
FIG. 7A is a sectional view of a battery pack according to another exemplary embodiment of the present invention.
Figure 7B:
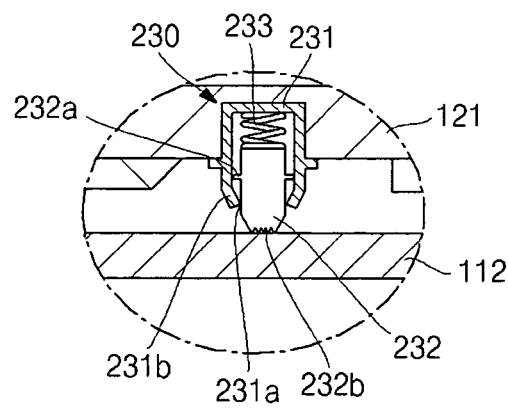
FIG. 7B is a magnified view of the circled part '7B' of FIG. 7A.
Figure 7C:
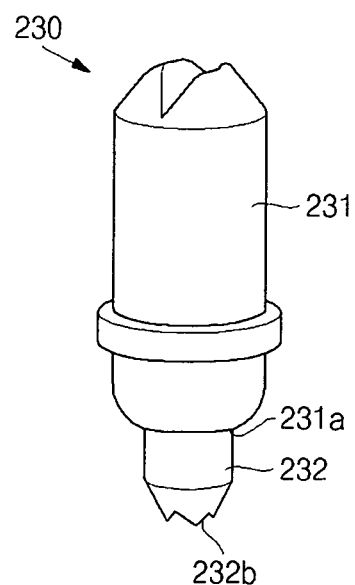
FIG. 7C is a perspective view of a pin used in the battery pack of FIG. 7A.

FIG. 7A is a sectional view of a battery pack according to another exemplary embodiment of the present invention and FIG. 7B is a magnified view of '7B' part of FIG. 7A and FIG. 7C is a perspective view of a pin.

Referring to FIGS. 7A to 7C, the battery pack 200 includes a bare cell 110 including a can 111 and a cap plate 112 sealing the can 111, a protection circuit module 120 including a protection circuit board 121 and a top case 140 combining the protection circuit module 120 to the bare cell 110, where the protection circuit board 121 includes a pin 230 whose one end is electrically coupled to the electrode terminals 112 and 113 of the bare cell 110.

In the battery pack 200, one end of the pin 230 is electrically coupled to the electrode terminal of the bare cell 110 and the other end is electrically coupled to an external terminal of the protection circuit module 120. Accordingly, the bare cell 110 and protection circuit module 120 are coupled to each other without welding, which is the same as the above embodiment.

The same drawing reference numerals are used for the same elements of the above embodiment and a detailed explanation thereof has been omitted. In FIG. 7A, only a portion corresponding to "7B" is shown as a sectional surface.

The pin 230 includes a pin housing 231 fixed to the protection circuit board 121, a connection pin 232 that is provided in the pin housing 231 and projected through an opening 231a of the pin housing 231, and an elastic member 233 elastically supporting the connection pin 232 toward the opening 231a. It is desirable that the elastic member 233 is a coil spring or a leaf spring.

A bent part 231b is formed inside the lower end of the pin housing 231 and a separation preventing part 232a is formed on an outer circumference of the connection pin 232 to prevent the connection pin 232 from being separated from the outside of the pin housing 231 by the bent part 231b.

The connection pin 232 of the pin 230 is formed in a shape of a truncated cone whose width is decreased toward the lower end thereof. In addition, several sharp projections are provided at the end 232b.

In the battery pack 200, when the protection circuit module 120 is assembled with the top case 140 and the top case 140 is combined with the upper part of the bare cell 110, the pin 230 provided in the protection circuit board 121 contacts the cap plate 112 and first electrode terminal 113. The connection pin 232 is elastically supported by the elastic member 233 in the pin housing 231 and thus, the pin 230 contacts the surfaces of the cap plate 112 and first electrode terminal 113. Therefore, the lower end of the connection pin 232 continuously contacts the cap plate 112 and first electrode terminal 113 even if an external impact occurs.

Thus, the connection pin 232 continuously maintains the electrical coupling path between the bare cell 110 and protection circuit module 120, thereby providing desirable coupling without welding.

Figure 8:
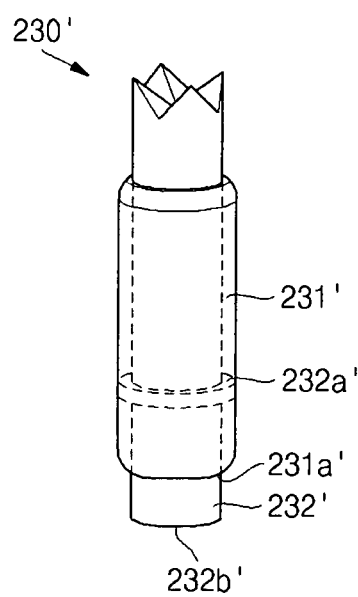
FIG. 8 is a perspective view of a pin according to still another exemplary embodiment of the present invention.

FIG. 8 is a view of a pin 230' according to still another exemplary embodiment of the present invention. A cylindrical connection pin 232' of the pin 230' is projected through a lower opening 231a' of a pin housing 231'. A separation preventing part 232a' is formed on an outer circumference of the pin 230'. An end 232b' of the pin 230' is formed circular and thus, the contact area between the end 232b' and the surface of cap plate 112 or first electrode terminal 113 is increased.

As described above, the battery pack according to the present invention produces the following effects.

The bare cell and protection circuit module can be electrically coupled to each other without welding by electrically coupling them to each other by the pin provided in the protection circuit module.

The bare cell is electrically coupled by the pin provided in the protection circuit module and the assemblage can be completed without the welding process, thereby significantly simplifying the assembling process.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the present invention.

What is claimed is:

1. A battery pack, comprising:
a bare cell including a cap plate and electrode terminals;
a protection circuit module including pins electrically coupled to the electrode terminals; and
a top case, receiving the protection circuit module, being combined with the bare cell,
wherein the pin comprises a first electrode pin arranged at a middle of a protection circuit board of the protection circuit module and connected to one of the electrode terminals and two second electrode pins arranged on opposite sides of the protection circuit board with the first electrode pin located between the two second electrode pins, said two second electrode pins connected to the cap plate.

2. The battery pack of claim 1, wherein the electrode terminals further comprise:
a first electrode terminal, electrically insulated from the cap plate and extending through and outward from the cap plate; and
a second electrode terminal formed of the cap plate.

3. The battery pack of claim 2, wherein the first electrode pin is connected to the first electrode terminal and the two second electrode pins are connected to the second electrode terminal.

4. The battery pack of claim 2, further comprising:
a first aperture arranged in the first electrode terminal; and
two second apertures in the cap plate, wherein the first electrode pin is inserted into the first aperture, and each of the two second electrode pins is inserted into each of the two second apertures.

5. The battery pack of claim 4, wherein the first and second apertures are rectangular or circular.

6. The battery pack of claim 1, wherein the two second electrode pins are riveted on the protection circuit board.

7. The battery pack of claim 1, wherein a sectional surface of the two second electrode pins are rectangular or circular.

8. The battery pack of claim 7, wherein a sectional surface area of each of the two second electrode pins gradually decreases toward a lower part of the second electrode pins.

9. The battery pack of claim 8, wherein an end of each of the two second electrode pins are rectangular or circular.

10. The battery pack of claim 8, wherein an end of the each of the two second electrode pins are a sharp cone.

11. The battery pack of claim 10, further comprising a stopper arranged on the protection circuit board to keep a gap between the protection circuit board and the cap plate.

12. The battery pack of claim 1, wherein a lower end of each the two second electrode pins is coated with an electrically conductive material.

13. The battery pack of claim 12, wherein the electrically conductive material comprises gold or silver.

14. The battery pack of claim 1, wherein the two second electrode pins comprise nickel.

15. The battery pack of claim 1, wherein a lower end of each the two second electrode pins is bonded to a surface of the electrode terminal.

16. The battery pack of claim 15, wherein the lower end of each the two second electrode pins is bonded to the surface of the electrode terminal by a conductive adhesive.

17. The battery pack of claim 1, wherein each of the two second electrode pins further comprises:
a pin housing fixed to the protection circuit board;
a connection pin projected through a lower opening from inside of the pin housing; and
an elastic member elastically supporting the connection pin in a direction of the lower opening.

18. The battery pack of claim 17, wherein a bent part is arranged at a lower end of the pin housing and a separation preventing part arranged on an outer circumference of the connection pin to prevent the connection pin from being separated through the lower opening of the pin housing.

19. The battery pack of claim 1, wherein the protection circuit board is combined integrally with the top case by right and left hook parts arranged at both sides inside the top case.

20. The battery pack of claim 1, further comprising a label surrounding an upper periphery of the bare cell and a lower periphery of the top case.

* * * * *